US007299497B2

(12) United States Patent
Howard

(10) Patent No.: US 7,299,497 B2
(45) Date of Patent: Nov. 20, 2007

(54) DETERMINING RELATIVE ATTACK SURFACE

(75) Inventor: Michael Howard, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 711 days.

(21) Appl. No.: 10/609,934

(22) Filed: Jun. 30, 2003

(65) Prior Publication Data

US 2004/0268343 A1 Dec. 30, 2004

(51) Int. Cl.
*G08B 23/00* (2006.01)

(52) U.S. Cl. .......................................................... 726/25

(58) Field of Classification Search .................. 726/25
See application file for complete search history.

(56) References Cited

U.S. PATENT DOCUMENTS

2003/0135749 A1* 7/2003 Gales et al. ................ 713/200
2003/0140250 A1* 7/2003 Taninaka et al. ............ 713/201
2004/0088581 A1* 5/2004 Brawn et al. ............... 713/201
2004/0128530 A1* 7/2004 Isenberg ..................... 713/200
2005/0005152 A1* 1/2005 Singh et al. ................ 713/200

OTHER PUBLICATIONS

Managing Software Security Risks, G. McGraw, *Computer*, vol. 35, No. 4, pp. 99-101, Apr. 2002, Cigital, Dulles, VA, USA.

* cited by examiner

*Primary Examiner*—Gilberto Barrón, Jr.
*Assistant Examiner*—Samson Lemma
(74) *Attorney, Agent, or Firm*—Workman Nydegger

(57) ABSTRACT

The relative attack surface quotient is computed for products to determine their relative susceptibility to attack. The relative attack surface can be calculated by identifying known avenues of attack that correspond to the product and by determining bias values that should be applied to the avenues of attack based upon desired criteria, including, the potential damage that can be caused by an attack. The appropriate bias is applied to each avenue of attack and the resulting bias-applied values are combined into a single relative attack surface quotient. The relative attack surface can be determined prior to or during utilization of a product. The product may include software, computing devices and networks. Upon determining a relative attack surface is too high, utilization of the product can be restricted.

17 Claims, 3 Drawing Sheets

200

| Avenues of Attack (210) | Bias (220) |
|---|---|
| Open sockets | 1 |
| Open RPC endpoints | 0.9 |
| Open named pipes | 0.8 |
| Services | 0.2 |
| Services running by default | 0.8 |
| Services running as SYSTEM | 0.9 |
| Active Web handlers | 1 |
| Active ISAPI Filters | 1 |
| Dynamic Web pages | 0.6 |
| Executable vdirs | 1 |
| Enabled Accounts | 0.7 |
| Enabled Accounts in admin group | 0.9 |
| Null Sessions to pipes and shares | 0.9 |
| Guest account enabled | 0.9 |
| Weak ACLs in FS | 0.7 |
| Weak ACLs in Registry | 0.4 |
| Weak ACLs on shares | 0.9 |
| VBScript Enabled | 1 |
| Jscript Enabled | 1 |
| ActiveX enabled | 1 |

| Avenues of Attack (310) | Identified Avenues of Attack (320) | Resulting Bias-Applied Values (330) |
|---|---|---|
| Open sockets | 16 | 16 |
| Open RPC endpoints | 18 | 16.2 |
| Open named pipes | 39 | 31.2 |
| Services | 63 | 12.6 |
| Services running by default | 34 | 27.2 |
| Services running as SYSTEM | 63 | 56.7 |
| Active Web handlers | 13 | 13 |
| Active ISAPI Filters | 4 | 4 |
| Dynamic Web pages | 134 | 80.4 |
| Executable vdirs | 3 | 3 |
| Enabled Accounts | 4 | 2.8 |
| Enabled Accounts in admin group | 1 | .9 |
| Null Sessions to pipes and shares | 1 | .9 |
| Guest account enabled | 0 | 0 |
| Weak ACLs in FS | 102 | 71.4 |
| Weak ACLs in Registry | 0 | 0 |
| Weak ACLs on shares | 0 | 0 |
| VBScript Enabled | 2 | 2 |
| Jscript Enabled | 2 | 2 |
| ActiveX enabled | 2 | 2 |
| | | 342.3 — Relative Attack Surface Quotient (340) |

*Fig. 3*

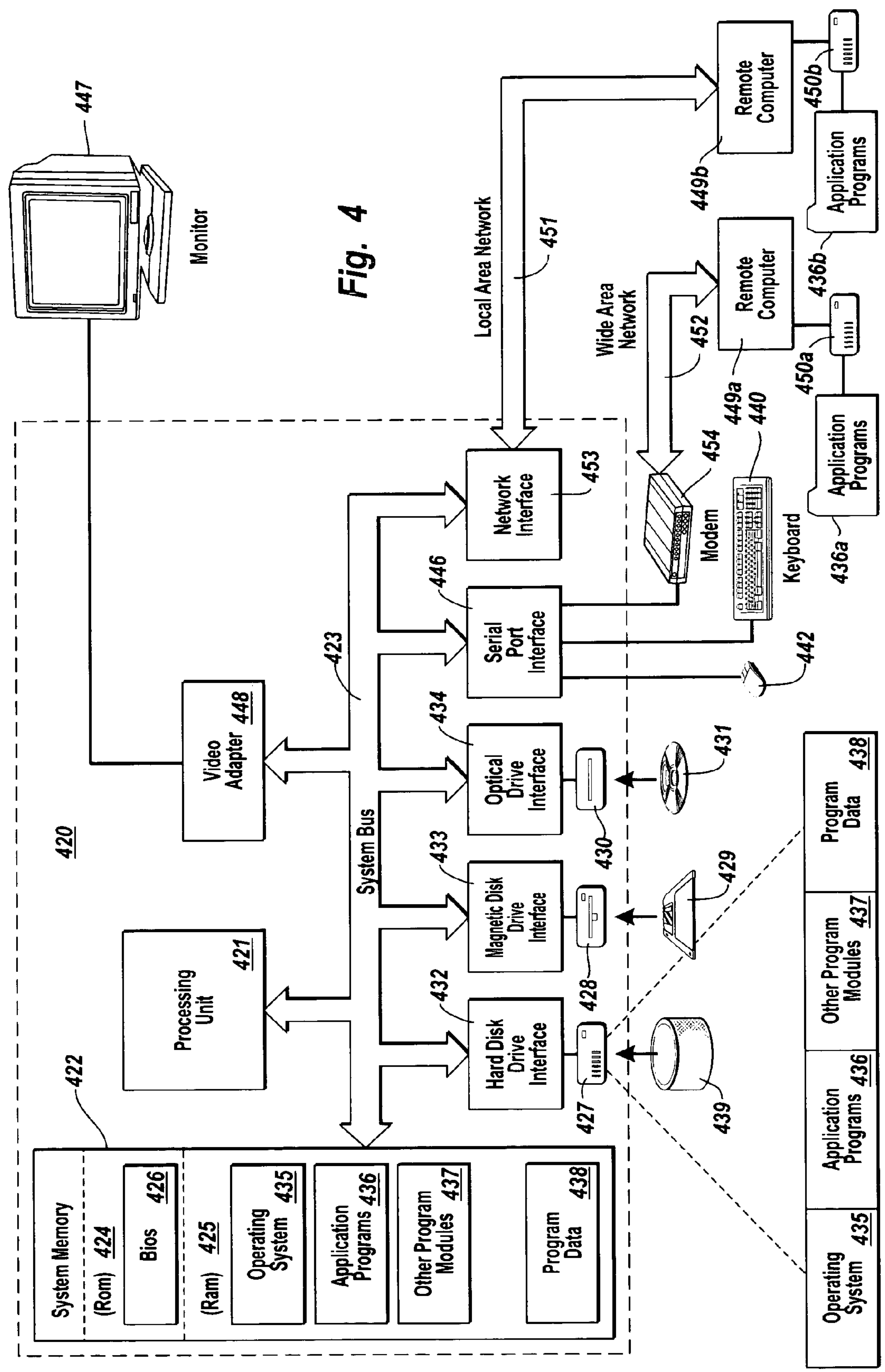

Fig. 4
Monitor
447
420
System Memory
422
(Rom) 424
Bios 426
(Ram) 425
Operating System 435
Application Programs 436
Other Program Modules 437
Program Data 438
Processing Unit 421
Video Adapter 448
System Bus
423
Hard Disk Drive Interface
432
Magnetic Disk Drive Interface
433
Optical Drive Interface
434
Serial Port Interface
446
Network Interface
453
427
428
429
430
431
439
442
Keyboard
440
Modem
454
Local Area Network
451
Wide Area Network
452
Remote Computer
449a
449b
450a
450b
Application Programs
436a
436b

DETERMINING RELATIVE ATTACK SURFACE

BACKGROUND OF THE INVENTION

1. The Field of the Invention

The present invention generally relates to methods and systems for protecting computer products such as software and devices from attack and, more particularly, to methods and systems for determining the relative susceptibility of computing software and devices to attack.

2. Background and Relevant Art

In the computer industry, it is well known that computer software and networks can be attacked, such as, for example, by hackers. In particular, hackers can breach the security features of a computer product, thereby obtaining access to valuable trade secret and personal information that is stored therein. Upon breaching the security features of a computer product, malicious hackers can alter programming and destroy valuable computing resources that are associated with the computer product.

Accordingly, in order to prevent some of the foregoing problems, the computing industry has continually attempted to secure known vulnerabilities and to develop new robust and secure computer products that are less likely to be attacked than the preceding products.

However, despite the best efforts that have been directed at overcoming known security deficiencies and for developing more secure products, the computing industry has yet to develop a method for determining the relative vulnerability of a computer product to attack, thereby making it difficult to determine how secure a product actually is. Accordingly, the question concerning which of two or more computer products is less vulnerable to attack is not an easy question to answer.

Prior to the present invention, the security and vulnerability of a computer product was determined largely upon the past history of the particular computer product. Even more particularly, the security of the computer product was typically determined by considering whether or not the computer product had been attacked in the past and whether or not the attack was successful. Such a determination, however, is subjective and based upon the conditional circumstances and timing in which the computer product was exposed to a potential attack.

Accordingly, one problem with the known techniques for determining a product's susceptibility to attack is that it may be inaccurate or at least give a false impression. For example, a relatively insecure product which is very vulnerable to attack, but which has, by fortune, never actually been the subject of an attack, may actually be perceived by some to be relatively more secure than a second product, that is in reality more secure, but which has successfully been attacked in the past by a very skilled attacker.

Yet another problem with known techniques for determining a product's susceptibility to attack is that they do not provide any objective measure by which a system operator can impose limits for determining whether a product should be utilized based upon an existing susceptibility of attack or a changing susceptibility of attack.

Accordingly, there is a need in the art for a more objective means for determining the relative susceptibility of computer products to attack.

BRIEF SUMMARY OF THE INVENTION

The present invention generally relates to methods, systems and computer program products for determining the relative susceptibility of computer products to attack.

According to one aspect of the invention, the relative attack surface of a computer product can be calculated and used for comparison with other products or established limits. In this manner, an objective measure for comparing the relative attack surface of competing products can be accomplished.

The relative attack surface can be calculated by identifying known avenues of attack that correspond to the product and by determining bias values that should be applied to the avenues of attack based upon any desired criteria, such as, for example, the potential damage that can be caused by an attack. Thereafter, the appropriate bias is applied to each avenue of attack that is identified within the computer product. The resulting bias-applied values are then combined into a single relative attack surface quotient.

In one embodiment, the relative attack surface of a computer product is determined, prior to installing the computer product into an existing system or network, such that the computer product will be installed only upon determining that the computer product has a sufficiently low attack surface.

In another embodiment, the relative attack surface of a computer product, such as a computing system in a network, is calculated repeatedly, so as to determine if the computing system ever exceeds a threshold attack surface quotient, at which time the use of the computing system may be restricted. For example, the computing system may be forced to shut down or to close certain applications that have undesirably increased the relative attack surface of the computing system.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2 illustrates one embodiment of a chart that lists avenues of attack and corresponding bias values;

FIG. 3 illustrates one embodiment a chart that lists potential avenues of attack, identified avenues of attack for a product, resulting bias-applied values that can be formed from applying the corresponding bias values of FIG. 2 to the identified avenues of attack, and a relative attack surface quotient that is formed therefrom; and FIG. 4 illustrates a block diagram of one embodiment of a computing environment in which methods of the invention may be practiced.

DETAILED DESCRIPTION OF THE PREFERRED EMBODIMENTS

Figure 1:
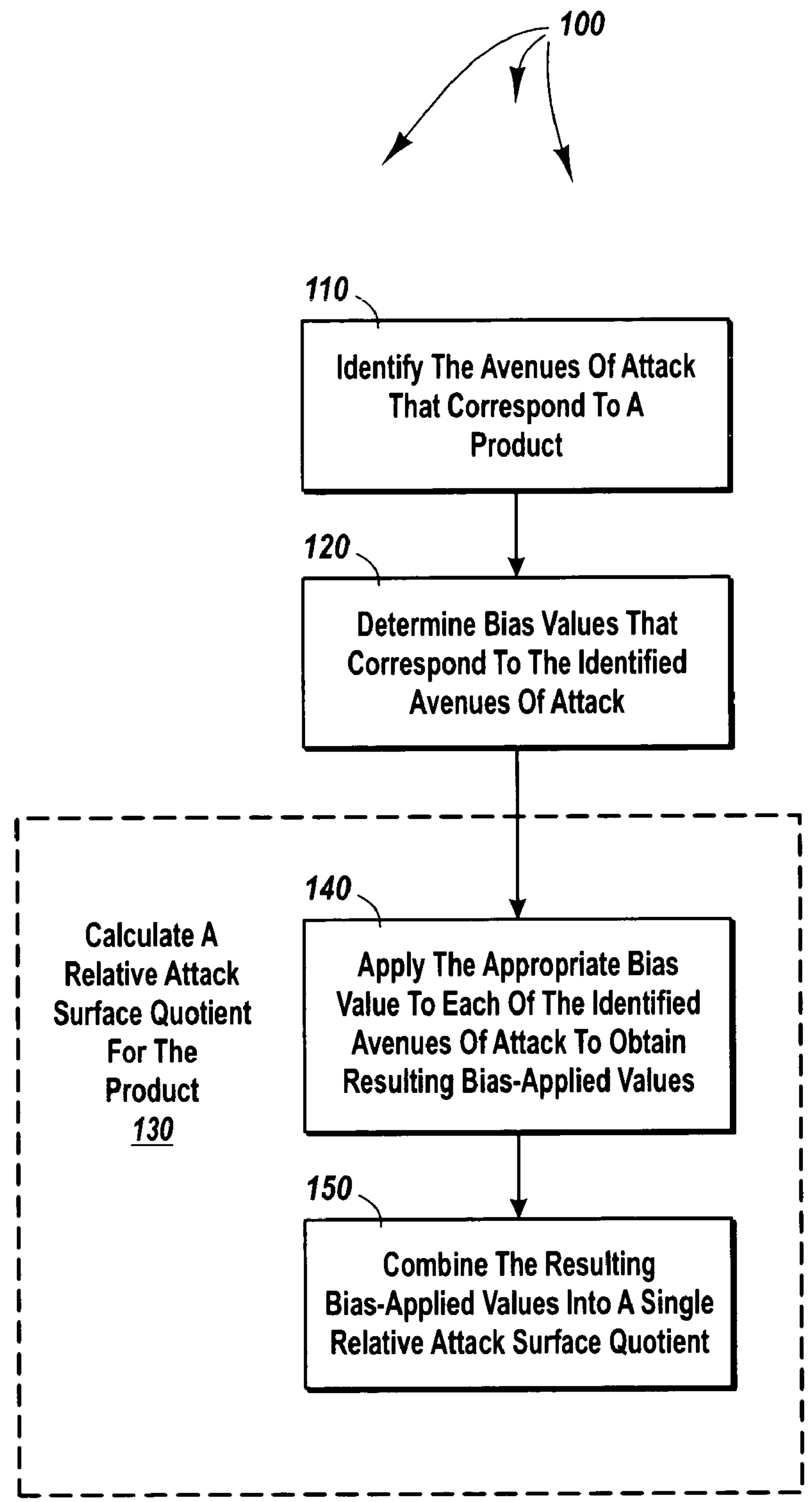
FIG. 1 illustrates one embodiment of a flowchart of a method for determining the relative susceptibility of a computer product to attack.

The present invention extends to methods, systems and computer program products for determining the relative susceptibility of a computer product to attack.

According to one aspect of the invention, a relative attack surface of a computer product can be calculated and used to determine whether utilization of the computer product should be restricted or enabled based upon a determination that relative attack surface meets or exceeds certain limits. The relative attack surface of a computer product can also be used as a basis of comparing the security of the computer product with the security of competing computer products. Additional features and advantages of the invention will be set forth in the description which follows.

The embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM, DVD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

To assist the reader in interpreting the scope of the invention, certain definitions will now be provided.

The term "computer product," as used herein, should be broadly construed to include computer software, computing devices, computing networks, and combinations thereof. The term "computer product" is also used interchangeably herein with the term "product."

Inasmuch as the term "utilize" is used with respect to utilizing computer products, the term "utilize," should be broadly construed to include embodiments in which computer products are installed, stored, run, or otherwise handled by the computer products.

The term "avenue of attack," as defined herein, generally refers to an object, component, connection, or characteristic of a computer product through which the computer product can be attacked by a hacker, virus, or other potentially harmful thing. Inasmuch as the present invention is not limited to any particular type of potential attack or methods in which a product can be attacked, it will be appreciated that the term "avenue of attack" is also not limited to any particular type of object, component, connection, or characteristic. Rather, the term "avenue of attack" can be defined differently in different embodiments to encompass any object, component, connection, characteristic, or combination thereof, through which a computer product can be attacked.

The term "attack," as defined herein, should be broadly interpreted to include any undesirable, unauthorized or malicious contact with a computer product, including, but not limited to accessing, hacking, snooping, modifying, destroying, damaging, copying, or otherwise utilizing or using in an undesirable, unauthorized or malicious manner.

The intended scope of other terms that are used herein will be explicitly described or will otherwise be apparent from the reading of the application.

Calculating the Relative Attack Surface Quotient

Attention is now directed to FIG. 1, which illustrates a flow chart of one embodiment for determining the relative susceptibility of a product to attack. As shown, the illustrated method includes various acts and a step which will now be described with specific reference to FIGS. 2 and 3.

The first recited act (act 110) includes identifying the avenues of attack that correspond to a product. Although this act may be accomplished entirely by the party performing the methods of the invention, it will also be appreciated that act 110 may be performed, at least in part, by a third party such as a standards body or another entity.

In one embodiment, the avenues of attack are determined based upon known vulnerabilities of a product type or a particular product. In another embodiment, the identified avenues of attack represent potential avenues of attack for a broad range of products that may or may not correspond directly to any particular type of product. If the avenues of attack are not initially related to a particular product or product type, the act of identifying the avenues of attack can also include the act of filtering a relevant list of potential avenues of attack from a larger list of potential avenues of attack.

FIG. 2 illustrates one embodiment of a chart 200 that recites various potential avenues of attack 210 that may correspond to a particular product. This list may be developed by the computing system that is now utilizing the list, by a third party, and may have been filtered, as described above. In this embodiment, the listed avenues of attack 210 include such things as open sockets, open RPC (Remote Procedure Call) endpoints, open named pipes, services, services running by default, services running as SYSTEM, active web handlers, etc. Each of the listed avenues of attack is determined in the present embodiment to be sufficiently relevant for testing a particular type of product, such as operating systems.

It will be appreciated, however, despite the present example, that the invention is not limited to any particular type of potential avenues of attack. Accordingly, the present list should not be considered exhaustive nor essential for all embodiments of the invention. Rather, the list of potential avenues of attack 210 can vary to accommodate different needs and preferences. For example, the current list of potential avenues of attack 210 is presently directed to potential avenues of attack for operating systems. However, in other embodiments, such as for testing computing devices and networks, the list of potential avenues of attack can be much more extensive and/or may not even include each of the presently illustrated avenues of attack 210.

The act of identifying the avenues of attack (act 110) that correspond to a product can also include the corresponding acts required to test the product (e.g., running a software evaluation of the product) to ascertain which if any of the potential avenues of attack actually exist within the product being tested. For example, to determine the number of sockets that may exist in an operating system, if any, can be performed by running an evaluation of the operating system. The evaluation of the operating system and of any other product can be performed, for example, with computing modules and specialized software that are configured to identify defined avenues of attack. Accordingly, the act of identifying avenues of attack may include, although not necessarily, the act of defining the avenues of attack that are to be identified.

In certain embodiments, the identification of the avenues of attack that correspond to a product is performed only once for a product, such as prior to utilizing the product. In other embodiments, the identification of the avenues of attack is performed iteratively, such as for example, by a network to ensure that a computing system in the network does not undesirably create or open up to too many avenues of attack through ancillary software applications, as described below in more detail.

Upon identifying the avenues of attack that correspond to a particular product (act 110), the method includes the act of determining bias values that correspond to the identified avenues of attack (act 120). In the present embodiment, the bias values are assigned a numerical value between zero and one. However, it will be appreciated that the invention is not limited to any particular range or type of bias values. Rather, the type and range of bias values can vary between different embodiments, so long as there is some objective measure that can be applied to correlate the bias values with their use.

The actual determination as to what avenues of attack warrant a higher bias value can be determined by the entity performing the methods of the invention, by a third party, or by a combination thereof. According to one embodiment, the relative bias value assigned to an avenue of attack is based at least in part upon a potential for damage of an attack if the attack where to occur through the corresponding avenue of attack. This potential for damage can include damage that is directed specifically to the computer product (e.g., hardware and software corruption, memory loss, etc.), as well as damage that occurs indirectly through computer product (e.g., unintended access to trade secret and private information, financial transactions, pirating of software, restricted network access, etc.).

It will also be appreciated that there are several other factors that can be used to determine the potential for damage. For example, the potential for damage can also include consideration of how often the product is likely to be attacked, the number of people that utilize or are otherwise exposed the product, sophistication of those that are exposed to the product, and the type of product, the resources available to the product, etc.

Upon determining the bias values for the identified avenues of attack (act 120), the method includes the step for calculating a relative attack surface quotient for the product (step 130). Step 130 comprises a function result oriented step that can be performed through the performance of one or more corresponding acts. In the present embodiment, step 130 includes the corresponding act of applying the appropriate bias value to each of the identified avenues of attack to obtain a resulting bias-applied value (act 140) and the corresponding act of combining the resulting bias-applied values into a single relative attack surface quotient (act 150). These acts will now be described in reference to the example that is illustrated in FIG. 3.

As shown in FIG. 3, a chart 300 has been prepared that includes a list of potential avenues of attack 310, as previously determined, that may correspond to a particular product. The chart 300 also includes a total number of identified avenues of attack 320 that have been identified as existing in the particular product at a particular time. Identifying the avenues of attack that actually exist within the product can be performed through independent testing, by referring to databases, or by any other suitable means, as generally described above.

As shown, the product being tested in the present example includes 16 open sockets, 18 open RPC (Remote Procedure Call) endpoints, 39 open named pipes, 63 services, and so forth. It will be appreciated that not every potential avenue of attack is determined to exist within a product being tested. For example, the currently tested product is found to have no guest enabled accounts. This, however, may be a result of the time in which the product is being tested. For this reason, it may be desirable to test a product, not only prior to utilizing the product but during utilization of the product to verify that the identified state of existing avenues of attack has not changed. In other words, the methods of the invention can be performed statically or in real-time, as desired.

FIG. 3 also illustrates a list of resulting bias-applied values 330, which are formed by applying the bias values of FIG. 2 to each corresponding avenues of attack that has been identified. For example, each of the 16 identified open sockets has had a bias value of 1 applied, resulting in a cumulative value of 16 (e.g., 16×1=16). Likewise, each of the 18 identified RPC endpoints has had a corresponding bias of 0.9 applied, resulting in a cumulative value of 16.2 (e.g., 18×0.9=16.2). The act of applying the appropriate bias value is also performed for each identified avenue of attack (act 140).

The resulting bias-applied values -330 are then combined into a single relative attack surface quotient 340. In the present embodiment, the relative attack surface quotient is formed by summing all of the resulting bias-applied values. It will be appreciated, however, that the invention is not limited to embodiments in which the act of combining the resulting bias-applied values (act 150) is performed only through addition. To the contrary, any desired algorithm may be applied or utilized to combine the resulting bias-applied values into a single relative attack surface quotient (act 150).

It will also be appreciated that the act of applying the bias value to the identified avenues of attack (act 140) may also be performed with the use of any desired algorithm, and does not, therefore, necessarily comprise straight multiplication of the bias value and the identified avenue of attack.

Use of the Relative Attack Surface Quotient

Once the relative attack surface quotient is obtained, it can be compared to the relative attack surface quotient of another product to determine which is relatively more susceptible to attack. The relative attack surface quotient can also be compared to threshold limits or other criteria to determine whether the product is sufficiently secure from potential attack to be utilized by a system or network.

In one embodiment of the invention, a computing system determines a relative susceptibility of a product (e.g., software application, computing system or network). This may be done without ever having to use the product. For example, it may be useful for an information clearing house, for example, to evaluate and publish results about various products to other devices.

In other embodiments, the relative susceptibility of a product to attack may be performed prior to utilizing the product. For example, a computer operator may choose to verify that an application will not expose the computer to undesired levels of potential attack. Likewise, a network may choose to verify that a computing system will not expose the network to undesired levels of potential attack.

In yet other embodiments, it may be desirable to verify that product is not susceptible to undesired levels of attack during utilizing the product. This can be particularly useful when the product is dynamic. For example, if a network includes multiple computing systems, it may be desirable for the network to periodically check each of the computing systems to verify that none of them individually or in combination exceed a predetermined threshold for susceptibility to attack. In such an embodiment, a computing system that is utilizing only relatively safe products when first tested may later utilize relatively unsafe products or the earlier products may become relatively unsafe. Therefore it may be desirable to become aware of this and to restrict the use of the products utilized by the computing system or the computing system itself.

In similar embodiments, an individual computing system may want to periodically verify that the software and other products utilized by the computing system maintain a relative susceptibility to attack that is within a certain prescribed limit. Otherwise, the computing system may restrict use of one or more products that have had an increase in their relative attack surface quotients.

In other embodiments, the actual attack surface quotient of a product being utilized may not exceed a threshold limit when considered by itself. However, the attack surface quotient of the product may still be considered to have exceeded the threshold limit if, when combined with the attack surface quotient of other products being utilized, causes a total combined attack surface quotient to exceed a desired level.

In summary, the present invention provides methods, systems and computer program products for determining a relative susceptibility of a product to attack. The embodiments of the invention include the calculation of a relative attack surface quotient that can be compared to established limits or with the relative attack surface quotients of other products. This can be beneficial for helping to provide an objective standard by which products can be compared and for maintaining a system security level that is within prescribed limits. Other features and benefits of the invention should be evident from practicing the invention.

Computing Environment

Although specific examples have been given and referred to herein, those skilled in the art will appreciate that the invention may be practiced in computing systems and network computing environments with various configurations, including personal computers, hand-held devices, multi-processor systems, microprocessor-based or programmable consumer electronics, network PCs, minicomputers, mainframe computers, and the like. The invention may also be practiced in distributed computing c z, environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 4, an exemplary system for implementing the invention includes a general purpose computing device in the form of a conventional computer 420, including a processing unit 421, a system memory 422, and a system bus 423 that couples various system components including the system memory 422 to the processing unit 421. The system bus 423 may be any of several types of bus structures including a memory bus or memory controller, a peripheral bus, and a local bus using any of a variety of bus architectures. The system memory includes read only memory (ROM) 424 and random access memory (RAM) 425. A basic input/output system (BIOS) 426, containing the basic routines that help transfer information between elements within the computer 420, such as during start-up, may be stored in ROM 424.

The computer 420 may also include a magnetic hard disk drive 427 for reading from and writing to a magnetic hard disk 439, a magnetic disk drive 428 for reading from or writing to a removable magnetic disk 429, and an optical disk drive 430 for reading from or writing to removable optical disk 431 such as a CD-ROM, DVD-ROM or other optical media. The magnetic hard disk drive 427, magnetic disk drive 428, and optical disk drive 430 are connected to the system bus 423 by a hard disk drive interface 432, a magnetic disk drive-interface 433, and an optical drive interface 434, respectively. The drives and their associated computer-readable media provide nonvolatile storage of computer-executable instructions, data structures, program modules and other data for the computer 420. Although the exemplary environment described herein employs a magnetic hard disk 439, a removable magnetic disk 429 and a removable optical disk 431, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 439, magnetic disk 429, optical disk 431, ROM 424 or RAM 425, including an operating system 435, one or more application programs 436, other program modules 437, and program data 438. A user may enter commands and information into the computer 420 through keyboard 440, pointing device 442, or other input devices (not shown), such as a microphone, joy stick, game pad, satellite dish, scanner, or the like. These and other input devices are often connected to the processing unit 421 through a serial port interface 446 coupled to system bus 423. Alternatively, the input devices may be connected by other interfaces, such as a parallel port, a game port or a universal serial bus (USB). A monitor 447 or another display device is also connected to system bus 423 via an interface, such as video adapter 448. In addition to the monitor, personal computers typically include other peripheral output devices (not shown), such as speakers and printers.

The computer 420 may operate in a networked environment using logical connections to one or more remote computers, such as remote computers 449*a* and 449*b*. Remote computers 449*a* and 449*b* may each be another personal computer, a server, a router, a network PC, a peer device or other common network node, and typically include many or all of the elements described above relative to the computer 420, although only memory storage devices 450*a* and 450*b* and their associated application programs 436*a* and 436*b* have been illustrated in FIG. 4. The logical connections depicted in FIG. 4 include a local area network (LAN) 451 and a wide area network (WAN) 452 that are presented here by way of example and not limitation. Such networking environments are commonplace in office-wide or enterprise-wide computer networks, intranets and the Internet.

When used in a LAN networking environment, the computer 420 is connected to the local network 451 through a network interface or adapter 453. When used in a WAN networking environment, the computer 420 may include a modem 454, a wireless link, or other means for establishing communications over the wide area network 452, such as the Internet. The modem 454, which may be internal or external, is connected to the system bus 423 via the serial port interface 446. In a networked environment, program modules depicted relative to the computer 420, or portions thereof, may be stored in the remote memory storage device. It will be appreciated that the network connections shown are exemplary and other means of establishing communications over wide area network 452 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for determining a relative susceptibility of a computing product to attack, the method comprising:

an act of identifying one or more avenues of attack that correspond to a computing product, each avenue of attack including a way the product can be attacked;

an act of determining a bias value for each identified avenues of attack, the bias value based upon an objective measure of the potential damage that can be caused by each identified avenue of attack, a higher bias value representing a greater potential damage; and an act of calculating an attack surface quotient for the computing product, the act of calculating comprising:

for each identified avenue of attack, an act of applying the bias value that corresponds to the identified avenue of attack, the act of applying the bias value including an act of multiplying the bias value and the corresponding identified avenue of attack to obtain a resulting bias-applied value; and combining the resulting bias-applied values by summing all the resulting bias-applied values for each identified avenue of attack.

2. A method as recited in claim 1, further including an act of comparing the relative attack surface quotient value with a relative attack surface quotient value of another product.

3. A method as recited in claim 1, further including an act of comparing the relative attack surface quotient value with a prescribed limit.

4. A method as recited in claim 1, further including an act of publishing the relative attack surface quotient to at least one other device.

5. A method as recited in claim 1, wherein the act of identifying one or more avenues of attack includes the computing system identifying the one or more avenues of attack from a third party.

6. A method as recited in claim 1, wherein the product comprises a software application.

7. A method as recited in claim 1, wherein the product comprises one of a computing system and a network.

8. A computer program product for use in a computing system that is configured to install a computing product, the computer program product including one or more computer-readable storage media having encoded thereon computer-executable instructions for implementing a method for determining a relative susceptibility of the computing product to attack on the computing system, the method comprising the method recited in claim 1.

9. A computer program product as recited in claim 8, further including an act of comparing the relative attack surface quotient value with a relative attack surface quotient value of another product.

10. A computer program product as recited in claim 8, further including an act of comparing the relative attack surface quotient value with a prescribed limit.

11. A computer program product as recited in claim 8, wherein the act of identifying one or more avenues of attack includes the computing system determining one or more potential avenues of attack.

12. A computer program product as recited in claim 8, wherein the act of identifying one or more avenues of attack includes the computing system identifying the one or more avenues of attack from a third party.

13. A computer program product as recited in claim 8, wherein the product comprises a software application.

14. A computer program product as recited in claim 8, wherein the product comprises one of a computing system and a network.

15. In a network comprising one or more computing systems, a method for determining a relative susceptibility of a computing product to attack and for determining whether to allow utilization of the computing product, the method comprising:

an act of identifying one or more avenues of attack that correspond to the computing product, each avenue of attack including a way the product can be attacked;

an act of determining a bias value for each identified avenue of attack, the bias value based upon an objective measure of the potential damage that can be caused by each identified avenue of attack, a higher bias value representing a greater potential damage;

an act of calculating an attack surface quotient for the computing product, the act of calculating comprising:

for each identified avenue of attack, an act of applying the bias value that corresponds to the identified avenue of attack, the act of applying the bias value including an act of multiplying the bias value and the corresponding identified avenue of attack to obtain a resulting bias-applied value; and combining the resulting bias-applied values by summing all the resulting bias-applied values for each identified avenue of attack; and an act of upon determining that the relative attack surface quotient for the product is within an acceptable range, permitting the product to be utilized at the computing system, or upon determining that the relative attack surface quotient for any of the one or more products is outside an acceptable range, restricting use of the one or more products at the one or more computing systems.

16. A method as recited in claim 15, wherein the act of identifying one or more avenues of attack includes the computing system identifying the one or more avenues of attack from information provided by a third party.

17. A method as recited in claim 15, wherein the product comprises a software application.

* * * * *